United States Patent [19]

Valyocsik

[11] Patent Number: 4,670,615
[45] Date of Patent: Jun. 2, 1987

[54] HYDROCARBON COMPOUND CONVERSION

[75] Inventor: Ernest W. Valyoçsik, Yardley, Pa.

[73] Assignee: Mobil Oil Corporation, New York, N.Y.

[21] Appl. No.: 826,422

[22] Filed: Feb. 5, 1986

Related U.S. Application Data

[63] Continuation-in-part of Ser. No. 682,492, Dec. 18, 1984, Pat. No. 4,632,815, which is a continuation of Ser. No. 541,618, Oct. 13, 1983, abandoned.

[51] Int. Cl.$^4$ .............................................. C07C 5/27
[52] U.S. Cl. .................................... 585/467; 585/470; 585/475; 585/481; 585/483; 585/486
[58] Field of Search ............... 585/470, 475, 483, 467, 585/486, 481

[56] References Cited

U.S. PATENT DOCUMENTS

| | | | |
|---|---|---|---|
| 4,157,356 | 6/1979 | Bulford et al. ...................... | 585/415 |
| 4,302,622 | 11/1981 | Chu ..................................... | 585/470 |
| 4,329,533 | 5/1982 | Chu ..................................... | 585/470 |
| 4,380,685 | 4/1983 | Chu ..................................... | 585/470 |
| 4,414,189 | 11/1983 | Kokotailo et al. .................. | 585/470 |
| 4,423,021 | 12/1983 | Rollmann et al. .................. | 423/333 |
| 4,490,342 | 12/1984 | Valyocsik ........................... | 423/328 |

FOREIGN PATENT DOCUMENTS 004220 12/1981 European Pat. Off. .
0077624 4/1983 European Pat. Off. .

OTHER PUBLICATIONS

C. Frondel, *The American Mineralogist*, 64 779–84 (1979).

Primary Examiner—Carl F. Dees
Assistant Examiner—A. Pal
Attorney, Agent, or Firm—A. J. McKillop; M. G. Gilman; L. P. Hobbes

[57] ABSTRACT

A process is provided for converting feedstock comprising aromatic hydrocarbon compounds to product comprising aromatic hydrocarbon compounds which differs from the feedstock over a catalyst composition comprising a crystalline layered silicate material.

6 Claims, No Drawings

HYDROCARBON COMPOUND CONVERSION

BACKGROUND OF THE INVENTION

Cross Reference

This is a continuation-in-part of application Ser. No. 682,492, filed Dec. 18, 1984, U.S. Pat. No. 4,632,815, which is a continuation of application Ser. No. 541,618, filed Oct. 13, 1983, now abandoned.

FIELD OF THE INVENTION

This invention relates to use of a catalyst composition comprising an active form of in improved, stable crystalline layered silicate related to Silica-X. In particular, this invention relates to use of such a catalyst composition in a process for converting feedstock comprising aromatic hydrocarbon compounds to product comprising aromatic hydrocarbon compounds which differs from the feedstock.

DESCRIPTION OF THE INVENTION

Silica-X having a silica/alumina mole ratio of 70 was prepared at 800° C. by Endell (Koll. Zietschrift, 111, 19-22 (1948)). Silica-X was subsequently reported in 1964 as a silica polymorph phase during the thermal transformation of amorphous silica to quartz (A. Heydemann, Beiti Z. Miner. Petrog., 10, 242-259 (1964)). In 1967 it was reported in *The American Minerologist*, 52, 1662-1668 (1967), that Silica-X was synthesized from silicic acid. Over the course of crystallization, three separately identifiable phases were noted. The first phase to appear was Silica-X, the second cristobalite and the third quartz. It was concluded there that in such synthesis a monotropic transformation was taking place which tended toward the most stable phase, i.e. quartz.

SUMMARY OF THE INVENTION

The present invention relates to a novel process for converting feedstock comprising aromatic hydrocarbon compounds to product comprising aromatic hydrocarbons which differs from said feedstock, e.g. isomerization, disproportionation and alkylation. The process uses a catalyst composition comprising an active form of a particular crystalline layered silicate related to Silica-X, but of enhanced purity, stability and having a wide range of $SiO_2/Al_2O_3$ molar ratios.

EMBODIMENTS

The layered silicate identified as Silica-X has been synthesized in the past by forming a mixture of sodium silicate and alkali hydroxide or carbonate and heating same at a temperature of from about 100° C. to about 250° C. No organic directing agent was used.

Silica-X prepared by such conventional method is observed as a transformation product in the conversion of amorphous silica to quartz as indicated above. Conventional preparations of Silica-X employ only strong alkali bases as mineralizers and generally require long reaction times, such as, for example, 24 days at 180° C. (A. Heydemann, supra, FIG. 3) and 41 days at 150° C. (*The American Mineralogist*, supra, Table 2). Except for the single preparation of Silica-X at 800° C. originally reported by Endell, supra, all known recent preparations of Silica-X have been conducted with pure silica sources, e.g. providing a $SiO_2/Al_2O_3$ reaction mixture ratio approaching infinity. Endell's preparation of Silica-X also contained contaminants identified as $TiO_2$, $Fe_2O_3$ and CaO. No catalytic applications have been identified for the conventionally prepared Silica-X.

The method for synthesis of the crystalline layered silicate for use in the present invention with a specific organic directing agent provides a highly crystalline material of controlled purity in a very short period of time, e.g. 72 hours. The method comprises forming a reaction mixture containing sources of silica; an alkali and/or alkaline earth metal oxide, e.g. sodium, potassium, cesium, calcium and/or strontium; alumina, a particular organic directing agent and water, and having a composition, in terms of mole ratios of oxides, within the following ranges:

|  | Broad | Preferred |
|---|---|---|
| $SiO_2/Al_2O_3 =$ | at least 40 | 60-5,000 |
| $H_2O/SiO_2 =$ | 10-100 | 20-60 |
| $OH^-/SiO_2 =$ | 0-1.0 | 0.1-0.5 |
| $M^+/SiO_2 =$ | 0-2.0 | 0.1-1.0 |
| $R/SiO_2 =$ | 0.01-2.0 | 0.05-1.0 | wherein R is the cation of an organic directing agent selected from the group consisting of tert-butyl-trimethylanalinium hydroxide and halide, N-methyl-3, 5-dimethylpyridinium hydroxide and halide, $((CH_3)_3N^+(CH_2)_4N^+(CH_3)_3)(X^-)_2$, wherein X is a halide and mixtures thereof, and M is at least one cation selected from the group consisting of alkali and alkaline earth metals and mixtures thereof.

In the above reaction mixture, the $SiO_2/Al_2O_3$ molar ratio is at least 40/1 and may approach infinity.

The improved layered silicate structure for use herein has the following formula in terms of mole ratios of oxides in the anhydrous state:

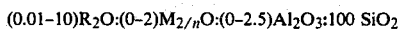

$$(0.01-10)R_2O:(0-2)M_{2/n}O:(0-2.5)Al_2O_3:100\ SiO_2$$

wherein R and M are as defined above, and n is the valance of M.

Silica-X possesses a definite distinguishing crystalline structure which exhibits an X-ray diffraction pattern showing the following lines (C. Frondel, *The American Mineralogist*, 64, 799 et seq. (1979)):

TABLE 1

| Observed 2 Theta | Interplanar d-Spacing (A) | Relative Intensity, $I/I_o$ |
|---|---|---|
| 4.99 | 17.70 | 40 |
| 6.10 | 14.5 | 3 |
| 10.20 | 8.67 | 18 |
| 12.21 | 7.25 | 16 |
| 14.24 | 6.22 | 21 |
| 15.28 | 5.80 | 8 |
| 16.20 | 5.47 | 3 |
| 17.49 | 5.07 | 13 |
| 20.51 | 4.33 | 40 |
| 21.31 | 4.17 | 5 |
| 24.32 | 3.66 | 5 |
| 26.34 | 3.384 | 100 |
| 30.80 | 2.903 | 2 |
| 35.59 | 2.522 | 11 |
| 41.40 | 2.181 | 3 |
| 49.45 | 1.843 | 20 |
| 56.41 | 1.631 | 2 |

It should be noted that Silica-X is an expandable layered silicate and not a zeolite. Basal X-ray spacings in materials of this type are not fixed and may vary over a wide range. The number of sharp diffraction maxima is usually quite limited and there are often large variations in the intensities of peaks. Since d-spacings of a layered silicate change with water content, it is considered appropriate to identify X-ray data of dehydrated samples of such materials, as done in the examples presented hereinafter.

When X-ray values were determined, the radiation was the K-alpha doublet of copper and a diffractometer equipped with a scintillation counter and an associated computer was used. The peak heights, I, and the positions as a function of 2 theta, where theta is the Bragg angle, were determined using algorithms on the computer associated with the spectrometer. From these, the relative intensities, 100 $I/I_o$, where $I_o$ is the intensity of the strongest line or peak, and d (obs.) the interplanar spacing in Angstroms (A), corresponding to the recorded lines, were determined. The relative intensities are given in terms of the strongest line being taken as 100. The sodium form of a layered silicate as well as other cationic forms reveal substantially the same pattern with some shifts in interplanar spacing and variation in relative intensity. Other variations can occur, depending on the silicon to aluminum ratio of the particular sample, as well as its degree of thermal treatment.

The improved layered silicate can be used either in the alkali or alkaline earth metal form, e.g. the sodium or potassium form; the ammonium form; the hydrogen form or another univalent or multivalent cationic form. When used as a catalyst it will be subjected to thermal treatment to remove part or all of the organic constituent.

The improved layered silicate can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition to the extent aluminum is in the structure, impregnated therein or intimately physically admixed therewith. Such component can be impregnated in or onto it such as for example, by, in the case of platinum, treating the silicate with a solution containing a platinum metal-containing ion. Thus, suitable platinum compounds include chloroplatinic acid, platinous chloride and various compounds containing the platinum amine complex.

The original alkali or alkaline earth metal cations of the as synthesized improved layered silicate can be replaced in accordance with techniques well known in the art, at least in part, by ion exchange with other cations. Preferred replacing cations include metal ions, hydrogen ions, hydrogen precursor, e.g. ammonium, ions and mixtures thereof. Particularly preferred cations include hydrogen, rare earth metals and metals of Groups IIA, IIIA, IVA, IB, IIB, IIIB, IVB, VIB and VIII of the Periodic Table of the Elements.

Typical ion exchange technique would be to contact the synthetic layered silicate with a salt of the desired replacing cation or cations. Examples of such salts include the halides, e.g. chlorides, nitrates and sulfates.

The improved layered silicate, especially in its metal, hydrogen and ammonium forms can be beneficially converted to another form by thermal treatment. This thermal treatment is generally performed by heating one of these forms at a temperature of at least 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product is particularly useful in the present process.

Further, the layered silicate, when employed either as an adsorbent or as a catalyst in the present conversion process should be dehydrated, at least partially. This can be done by heating to a temperature in the range of 200° C. to 595° C. in an inert atmosphere, such as air, nitrogen, etc. and at atmospheric, subatmospheric or superatmospheric pressures for between 30 minutes and 48 hours. Dehydration can also be performed at room temperature merely by placing the new layered silicate in a vacuum, but a longer time is required to obtain a sufficient amount of dehydration. Therefore, depending upon the degree of dehydration or thermal treatment desired for the new layered silicate, it may be subjected to heating at a temperature of from about 200° C. to about 925° C. for a time of from about 1 minute to about 48 hours.

The improved layered silicate is synthesized from the above reaction mixture at either static or stirred condition in a suitable reactor vessel, such as for example, polypropylene jars or teflon lined or stainless steel autoclaves. The useful range of temperatures for crystallization is from about 100° C. to about 215° C. for a time of about 72 hours to about 120 days. Thereafter, the crystals are separated from the liquid and recovered. The composition can be prepared utilizing materials which supply the appropriate oxides. Such compositions may include sodium silicate, silica hydrosol, silica gel, silicic acid, sodium hydroxide, a source of aluminum and the appropriate organic directing agent.

The organic directing agent is critical for the low temperature, rapid synthesis of the layered silicate for use in present invention. It may be tert-butyl-trimethylanalinium hydroxide or halide, N-methyl-3,5-dimethylpyridinium hydroxide or halide, or $((CH_3)_3N^+(CH_2)_4N^+(CH_3)_3)(X^-)_2$, where X is a halide, or mixtures thereof.

The crystals of layered silicate prepared can be shaped into a wide variety of particle sizes. Generally speaking, the particles can be in the form of a powder, a granule, or a molded product, such as an extrudate having a particle size sufficient to pass through a 2 mesh (Tyler) screen and be retained on a 400 mesh (Tyler) screen. In cases where the composition is molded, such as by extrusion, the crystals can be extruded before drying or partially dried and then extruded.

In the case of many catalysts, it is desired to incorporate the new layered silicate for use herein with another material resistant to the temperatures and other conditions employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new layered silicate, i.e. combined therewith, which is active, tends to improve the conversion and/or selectivity of the catalyst in certain organic converion processes. Inactive materials suitably serve as diluents to control the amount of conversion in a given process so that products can be obtained economically and orderly without employing other means for controlling the rate of reaction. These materials may be incorporated into naturally occurring clays, e.g. bentonite and kaolin, to improve the crush strength to the catalyst under commercial operating conditions. Said materials, i.e. clays, oxides, etc., function as binders for the catalyst. It is desirable to provide a catalyst having good crush strength because in commercial use it is desirable to prevent the catalyst from breaking down into powder-like materials. Clay binders have been employed normally only for the purpose of improving the crush strength of the catalyst.

Naturally occurring clays which can be composited with the new crystal include the montmorillonite and kaolin families which include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, notably alumina.

In addition to the foregoing materials, the layered silicate crystal can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided crystalline material and inorganic oxide gel matrix vary widely, with the crystal content ranging from about 1 to about 90 percent by weight and more usually, particularly when the composite is prepared in the form of beads, in the range of about 2 to about 80 weight percent of the composite.

The present process includes converting feedstock comprising aromatic compounds selected from the group consisting of benzene and monocyclic alkyl-substituted benzene of from 7 to 10 carbon atoms to product comprising aromatic compounds which differs from said feedstock, examples of which include isomerizing xylene feedstock components to product of different para:meta:ortho isomer ratio with reaction conditions including a temperature from about 230° C. to about 510° C., a pressure of from about 3 atmospheres to about 35 atmospheres, a weight hourly space velocity of from about 0.1 hr$^{-1}$ to about 200 hr$^{-1}$ and a hydrogen/hydrocarbon mole ratio of from 0 (no added hydrogen) to about 100; disproportionating toluene to product comprising benzene and xylenes with reaction conditions including a temperature of from about 200° C. to about 760° C., a pressure of from about atmospheric to about 60 atmospheres and a weight hourly space velocity of from about 0.08 hr$^{-1}$ to about 20 hr$^{-1}$; alkylating aromatic hydrocarbons, e.g. benzene and C$_7$ and C$_8$ alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 hr$^{-1}$ to about 2000 hr$^{-1}$ and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 hr$^{-1}$ to about 1000 hr$^{-1}$ and an aromatic hydrocarbon/polyalkylaromatic hydrocarbon mole ratio of from about 1/1 to about 16/1.

Reaction conditions for the conversion of aromatics as above-detailed include, in general, a temperature of from about 200° C. to about 760° C., a pressure of from about atmospheric to about 200 atmospheres, a weight hourly space velocity of from about 0.08 hr$^{-1}$ to about 2000 hr$^{-1}$, and a hydrogen/feedstock aromatic hydrocarbon mole ratio of from 0 (no added hydrogen) to about 100.

Feedstock aromatic compounds converted hereby include individually and in mixture benzene and monocyclic alkyl-substituted benzene of from 7 to 10 carbon atoms having the structure

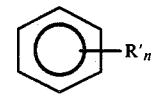

wherein R' is methyl, ethyl or a combination thereof, and n is an integer of from 1 to 4. In other words, the feedstock aromatic compounds may be benzene, benzene containing from 1 to 4 methyl and/or ethyl group substituents, and mixtures thereof. Non-limiting examples of such feedstock compounds include benzene, toluene, xylene, ethylbenzene, mesitylene (1,3,5-trimethylbenzene), durene (1,2,4,5-tetramethylbenzene), pseudocumene (1,2,4-trimethylbenzene) and mixtures thereof.

Other reactant species may be present, such as for alkylation. Alkylating agent species include olefins such as ethylene, propylene, dodecylene, as well as formaldehyde, alkyl halides and alcohols; the alkyl portion thereof having from 1 to 24 carbon atoms. Numerous other acyclic compounds having at least one reactive alkyl radical may be utilized as alkylating agents.

Products of the present conversion process include alkyl-substituted benzene compounds which differ from feedstock compounds depending upon the conversion desired. The following listing presents non-limiting examples:

| Feedstock Aromatic Compounds Include | Other Reactants Include | Product Aromatic Compounds Include |
|---|---|---|
| Benzene | Ethylene | Ethylbenzene |
| Toluene | Methanol | Xylene isomers |
| Xylene isomers, e.g., 9:73:18 wt. ratio of para:meta:ortho | — | Different combination of xylene isomers, e.g. 23:57:20 wt. ratio of para:meta:ortho |
| Toluene | — | Benzene and xylenes |
| Benzene | Propylene | Cumene and diisopropylbenzene |
| Toluene | Propylene | Cymene isomers |

Mechanisms of the present process may be isomerization, alkylation, transalkylation and disproportionation. Disproportionation is a special case of transalkylation in which the alkylatable aromatic compound and the transalkylating agent is the same compound, for example, when toluene serves as the doner and acceptor of the transferred methyl group to produce benzene and xylene. Use of the term transalkylation includes the special case of disproportionation.

In order to more fully illustrate the nature of the invention and the manner of practicing same, the following examples are presented. In the examples, whenever adsorption data are set forth for comparison of sorptive capacities for water, 3-methylpentane, cyclohexane and/or n-hexane, they were determined as follows:

A weighed sample of the calcined adsorbant was contacted with the desired pure adsorbate vapor in an adsorption chamber, evacuated to less than 1 mm and contacted with 12 mm Hg of water vapor or 20 mm Hg of n-hexane, 3-methylpentane or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the new crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined (550° C. at 50° C./minute in air) adsorbant.

When Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$) In the case of zeolite HZSM-5, only 174 ppm of tetrahedrally coordinated $Al_2O_3$ are required to provide an Alpha Value of 1. The Alpha Test is described in U.S. Pat. No. 3,354,078 and in *The Journal of Catalysis*, Vol. IV, pp. 527-529 (August 1965), each incorporated herein by reference as to that description.

The relationship of Alpha Value to the intrinsic rate constants for other acid-catalyzed reactions, such as that of the present invention, is detailed in "The Active Site of Acidic Aluminosilicate Catalysts", *Nature*, Vol. 309, No. 5969, pp. 589-591, 11 June 1984, incorporated herein as to that detail.

EXAMPLES 1-5

Five separate synthesis reaction mixtures were prepared with compositions listed in Table 3. No independent source of aluminum was added to these reaction mixtures. For Examples 1, and 5, silica sol (30% $SiO_2$, 70% $H_2O$), NaOH, and water were mixed with an organic directing agent referred to as Diquat-4 halide, having the formula $((CH_3)_3N^+(CH_2)_4N^+(CH_3)_3)(I^-)_2$. For Examples 2 and 3, instead of silica sol, sodium silicate (27.8% $SiO_2$, 8.4% $Na_2O$, 63.8% $H_2O$) was mixed with water, and the $OH^-/SiO$ molar ratio was adjusted to the desired level with $H_2SO_4$. The mixtures were maintained at 160° C. until crystallization appeared complete, i.e. 3 days for Example 3, and 4 days for Examples 1, 2, 4 and 5, in a stainless steel, stirred (400 rpm) autoclave. The solids were separated from any unreacted components by filtration and then water washed followed by drying at 110° C. The product crystals were analyzed by X-ray diffraction. The products from Examples 2, 3 and 5 were 100% crystalline improved layered silicate for use in the present invention. The product crystals of Examples 1 and 4 were 50% and 60%, respectively, said layered silicate.

TABLE 3

| Example | \multicolumn{6}{c}{Reaction Mixture Composition (Mole Ratios)} | | | | | |
|---|---|---|---|---|---|---|
| | $SiO_2/Al_2O_3$ | $H_2O/SiO_2$ | $OH^-/SiO_2$ | $Na^+/SiO_2$ | $K^+/SiO_2$ | $R^{(1)}/SiO_2$ |
| 1 | ∞ | 40 | 0.40 | 0.40 | — | 0.10 |
| 2 | ∞ | 40 | 0.30 | 0.59 | — | 0.10 |
| 3 | ∞ | 40 | 0.30 | 0.59 | — | 0.10 |
| 4 | ∞ | 40 | 0.30 | — | 0.30 | 0.10 |
| 5 | ∞ | 40 | 0.30 | 0.30 | — | 0.10 |

$^{(1)}R = (CH_3)_3N^+(CH_2)_4N^+(CH_3)_3$

The crystal layered silicate products of Examples 2-5 were analyzed for composition and the product of Example 5 was examined for sorption capacities. Presented in Table 4 are the analytical and sorption results. The product of Example 2 was tested for Alpha Value after conversion to the hydrogen-form by air calcination of the $NH_4^+$-form of the material at 550° C. The Alpha Value was 2.7.

TABLE 4

| | Product Analysis, Moles per Mole of $Al_2O_3$ | | | | Sorption Data, g/100 g | | |
|---|---|---|---|---|---|---|---|
| Example | $N_2O$ | $Na_2O$ | $K_2O$ | $SiO_2$ | n-hexane | cyclo-hexane | water |
| 2 | 5.9 | 1.5 | — | 140 | — | — | — |
| 3 | — | 5.3 | — | 724 | — | — | — |
| 4 | 47.7 | — | 11.3 | 1470 | — | — | — |
| 5 | 44.4 | 7.3 | — | 1490 | 1.4 | 1.2 | 2.0 |

The X-ray diffraction pattern of the product layered silicate from Example 5, having been calcined in air at 550° C., is presented in Table 5, below:

TABLE 5

| Observed 2 Theta | Interplanar d-Spacing (A) | Relative Intensity, $I/I_o$ |
|---|---|---|
| 4.95 | 17.85 | 56 |
| 10.00 | 8.84 | 16 |
| 12.15 | 7.28 | 12 |
| 14.10 | 6.15 | 16 |
| 15.10 | 5.87 | 7 |
| 16.00 | 5.53 | 2 |
| 17.40 | 5.10 | 11 |
| 20.30 | 4.37 | 9 |
| 21.40 | 4.15 | 8 |
| 24.65 | 3.61 | 9 |
| 26.20 | 3.40 | 100 |
| 30.50 | 2.93 | 7 |
| 35.40 | 2.54 | 4 |
| 40.80 | 2.21 | 4 |
| 49.30 | 1.84 | 10 |
| 54.00 | 1.70 | 4 |

EXAMPLES 6 AND 7

Two separate synthesis reaction mixtures were prepared with compositions listed in Table 6. The source of aluminum added to these reaction mixtures was $Al_2(SO_4)_3 \cdot 16H_2O$. Silica sol (30% $SiO_2$, 70% $H_2O$), NaOH, the source of aluminum, and water were mixed with an organic directing agent referred to as Diquat-4 halide, having the formula $((CH_3)_3N^+(CH_2)_4N^+(CH_3)_3)(I^-)_2$. The mixtures were maintained at 160° C. until crystallization appeared complete, i.e. 5 days, in a stainless steel, stirred (400 rpm) autoclave. The solids were separated from any unreacted components by filtration and then water washed followed by drying at 110° C. The product crystals were analyzed by X-ray diffraction. The products from each example were 40% crystalline improved layered silicate of the present invention.

TABLE 6

| Example | Reaction Mixture Composition (Mole Ratios) | | | | |
|---|---|---|---|---|---|
| | $SiO_2/Al_2O_3$ | $H_2O/SiO_2$ | $OH^-/SiO_2$ | $Na^+/SiO_2$ | $R^{(1)}/SiO_2$ |
| 6 | 90 | 40 | 0.20 | 0.29 | 0.05 |
| 7 | 60 | 40 | 0.20 | 0.33 | 0.05 |

$^{(1)}R = (CH_3)_3N^+(CH_2)_4N^+(CH_3)_3$

EXAMPLES 8–11

Four separate synthesis reaction mixtures were prepared with compositions listed in Table 7. No independent source of aluminum was added to the reaction mixtures for Examples 9, 10 and 11, and sodium aluminate was added as a source of aluminum for Example 8. Silica sol (30% $SiO_2$, 70% $H_2O$), NaOH and water (and $NaAlO_2$ for Example 8) were mixed with an organic directing agent of N-methyl-3,5-dimethylpyridinium iodide (for Examples 8, 9 and 11) and tert-butyl-trimethylanalinium iodide (for Example 10). The mixtures were maintained at 160° C. until crystallization appeared complete, i.e. 4 days for Examples 8, 10 and 11 and 5 days for Example 9, in a stainless steel, stirred (400 rpm) autoclave. The solids were separated from any unreacted components by filtration and then water washed followed by drying at 110° C. The product crystals were analyzed by X-ray diffraction. The products from Examples 9 and 10 were 100% crystalline improved layered silicate for use in the present invention. The product crystals of Examples 8 and 11 were nearly 100% said layered silicate with trace zeolite ZSM-5 also present.

TABLE 7

| Example | Reaction Mixture Composition (Mole Ratios) | | | | |
|---|---|---|---|---|---|
| | $SiO_2/Al_2O_3$ | $H_2O/SiO_2$ | $OH^-/SiO_2$ | $Na^+/SiO_2$ | $R/SiO_2$ |
| 8 | 500 | 40 | 0.20 | 0.20 | 0.25* |
| 9 | ∞ | 40 | 0.30 | 0.30 | 0.25* |
| 10 | ∞ | 40 | 0.20 | 0.20 | 0.10** |
| 11 | ∞ | 40 | 0.10 | 0.10 | 0.25* |

*R = N—methyl-3,5-dimethylpyridinium
**R = Tert-butyl-trimethylanalinium

EXAMPLE 12

To exemplify operation of the present invention, a 2 gram quantity of calcined product from Example 2 is placed in a reactor vessel and contacted with a feedstock comprised of 80% m-xylene and 20% ethylbenzene in the presence of added hydrogen at a ratio of hydrogen/hydrocarbons of 6.5/1. At reaction conditions including a temperature of 428° C., 58.5 WHSV ($hr^{-1}$) and a pressure of 10.2 atmospheres, approximately 50% of the m-xylene and ethylbenzene are converted. The product is comprised as follows, values approximate:

| Product Component | Wt. % |
|---|---|
| Benzene | 4 |
| Toluene | 1 |
| Ethylbenzene | 9 |
| p-Xylene | 18 |
| m-Xylene | 39 |
| o-Xylene | 18 |
| Ethyltoluenes | 1 |
| Trimethylbenzenes | 3 |
| Other | 7 |

Other organic directing agents found useful for synthesis of other crystalline silicates, e.g. zeolites ZSM-5 and ZSM-22, were found not to be useful for synthesis of the present improved layered silicate from reaction mixtures as above defined. For instance, when tetrapropylammonium bromide is substituted for the alkylanalinium compound in Example 10, zeolite ZSM-5 is synthesized. When 1,6-diaminohexane is substituted for the alkylpyridinium compound in Example 9, zeolite ZSM-22 is synthesized instead of the improved layered silicate of the present invention.

The entire contents of application Ser. No. 682,492, filed Dec. 18, 1984, are incorporated herein by reference.

What is claimed is:

1. A process for transalkylating a feedstock comprising aromatic hydrocarbons including monocyclic alkyl-substituted benzene of from 7 to 10 carbon atoms and mixtures thereof, alkyl being methyl, ethyl or a combination thereof, which comprises contacting said feedstock at transalkylation conditions with a catalyst composition comprising an active form of a crystalline layered silicate having the X-ray diffraction pattern shown in Table 1 of the specification and a composition as synthesized on an anhydrous basis in terms of moles of oxides per mole of silica expressed by the formula:

$(0.01-10)R_2O:(0-2)M_{2/n}O:(0-2.5)Al_2O_3:100\ SiO_2$ wherein R is at least one cation of an organic directing agent selected from the group consisting of tert-butyl-trimethylanalinium hydroxide, tert-butyl-trimethylanalinium halide, N-methyl-3,4-dimethylpyridinium hydroxide, N-methyl-3,5-dimethylpyridinium halide, $((CH_3)_3N^+(CH_2)_4N^+(CH_3)_3)\ (X^-)_2$, where X is a halide, and mixtures thereof, M is at least one cation selected from the group consisting of alkali and alkaline earth metal and mixtures thereof and n is the valence of M.

2. The process of claim 1 wherein said X is chloride, bromide or iodide.

3. The process of claim 1 wherein said catalyst composition is a composite of said layered silicate material and a matrix.

4. The process of claim 3 wherein said matrix is alumina.

5. The process of claim 1 wherein said transalkylation conditions include a temperature of from about 200° C. to about 760° C., a pressure of from about atmospheric to about 200 atmospheres, a weight hourly space velocity of from about 0.08 $hr^{-1}$ to about 2000 $hr^{-1}$ and a hydrogen/feedstock hydrocarbon mole ratio of from 0 to about 100.

6. The process of claim 1 wherein said feedstock aromatic hydrocarbons comprise toluene and said transalkylation comprises disproportionation of said toluene.

* * * * *

UNITED STATES PATENT AND TRADEMARK OFFICE
CERTIFICATE OF CORRECTION

PATENT NO. : 4,670,615

DATED : June 2, 1987

INVENTOR(S) : Valyocsik

It is certified that error appears in the above-identified patent and that said Letters Patent is hereby corrected as shown below:

Col. 10, line 43 "4-dimethylpyridinium hydroxide" should read
--5-dimethylpyridinium--.

Signed and Sealed this

Twentieth Day of June, 1989

*Attest:*

DONALD J. QUIGG

*Attesting Officer*  *Commissioner of Patents and Trademarks*